(12) United States Patent
Thermos

(10) Patent No.: US 6,227,061 B1
(45) Date of Patent: *May 8, 2001

(54) MOUNTING BLOCK FOR A PROXIMITY PROBE USED FOR MEASURING AXIAL MOVEMENT OF A ROTOR

(75) Inventor: Anthony Constantine Thermos, Greer, SC (US)

(73) Assignee: General Electric Co., Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/371,820

(22) Filed: Aug. 11, 1999

(51) Int. Cl.⁷ .................................................. G08G 5/04
(52) U.S. Cl. ................................................. 73/866.5
(58) Field of Search ................... 73/866.5, 660, 73/661; 417/63; 416/61; 324/207.22, 207.24, 207.25, 173, 174

(56) References Cited

U.S. PATENT DOCUMENTS

| | | | |
|---|---|---|---|
| 3,541,540 | * | 11/1970 | Hughes ................................. 73/661 |
| 4,495,810 | * | 1/1985 | Tessarzik et al. ...................... 73/661 |
| 5,704,692 | * | 1/1998 | Purdy et al. ..................... 324/207.22 |
| 6,037,581 | * | 3/2000 | Zorner ................................... 73/660 |

FOREIGN PATENT DOCUMENTS

| | | | |
|---|---|---|---|
| 2928610 | * | 2/1981 | (DE) ..................................... 324/173 |
| 56-126721 | * | 11/1987 | (JP) ........................................ 73/660 |
| 62-263470 | * | 11/1987 | (JP) ..................................... 324/173 |

* cited by examiner

Primary Examiner—Robert Raevis
(74) Attorney, Agent, or Firm—Nixon & Vanderhye

(57) ABSTRACT

A quill for locating a measuring device in proximity to a rotor surface includes a body portion having a bore oriented at an acute angle relative to horizontal, the bore adapted to receive a forward end of the measuring device; and a mounting flange portion for securing the quill to a machine component.

9 Claims, 2 Drawing Sheets

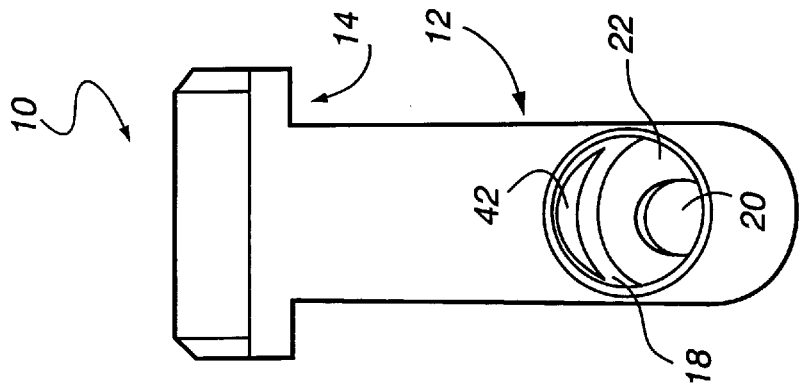
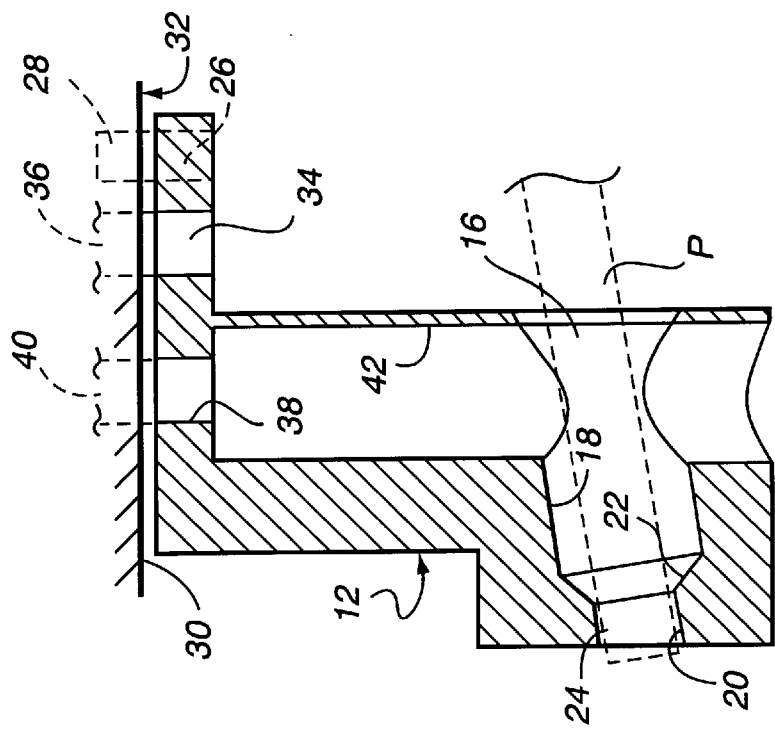
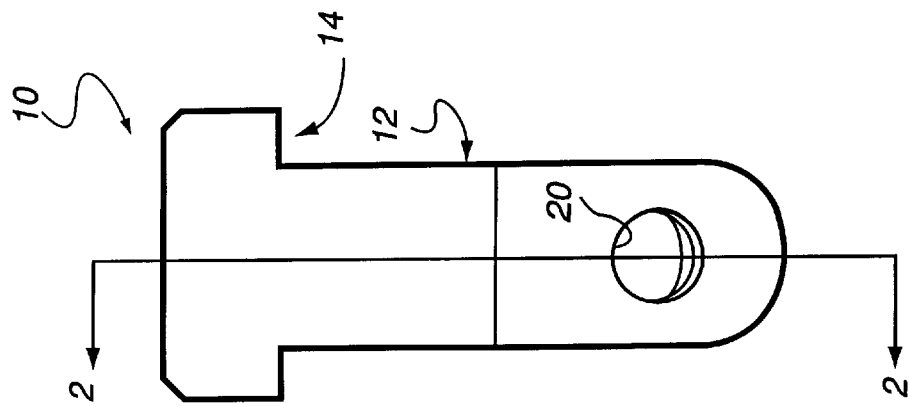

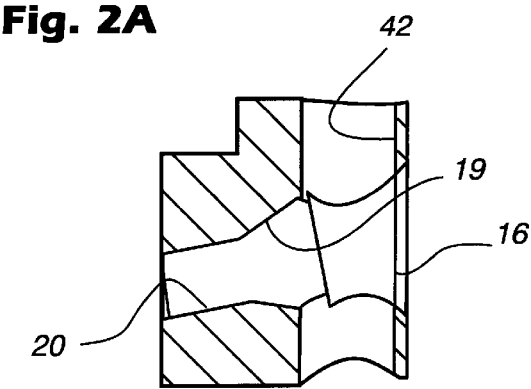
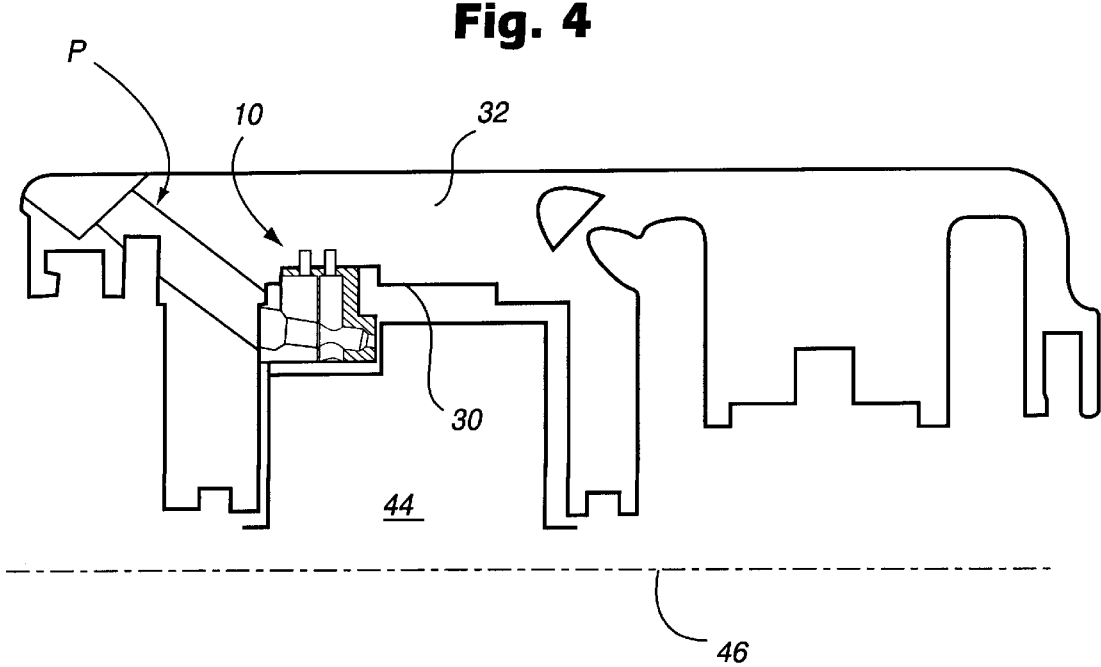

MOUNTING BLOCK FOR A PROXIMITY PROBE USED FOR MEASURING AXIAL MOVEMENT OF A ROTOR

TECHNICAL FIELD

The present invention relates to rotating machinery such as gas or steam turbines and, specifically, to a quill or mounting block configuration for supporting an axial proximity probe used to measure axial movement of the machine rotor.

BACKGROUND OF THE INVENTION

Quills used for the axial proximity probes direct the probes parallel to the machine axis, and position the probe normal to the surface being measured. This current quill configuration does not allow easy assembly of the proximity probe hardware. The result is expensive proximity probes are sometimes destroyed during their installation. Of even more concern is the fact that, if the probe cannot be detected at fault during the installation process, then the problem reveals itself as an oil leak through the probe during the unit's operation. The unit then has to be shut down and the probe repaired. This is an expensive and time consuming process.

BRIEF SUMMARY OF THE INVENTION

The present invention relates to a new quill configuration which supports the proximity probe at an angle of 10° from the horizontal axis of the machine unit. The new quill allows accurate measurements of the rotor's axial movement with the advantage of easier installation without any compromise in the accuracy of the probe measurement.

Accordingly, in its broader aspects, the invention relates to a quill component for supporting a probe used to measure axial movement or a horizontally arranged rotor in a rotary machine, the quill comprising a block adapted to be mounted on a bearing component of the rotary machine, the block having a probe bore extending through the block at an angle of about 10° relative to the horizontally arranged rotor.

BRIEF DESCRIPTION OF THE DRAWINGS

FIG. 1 is an end view of a quill in accordance with the invention;

FIG. 2 is a side section taken along the line 2—2 of FIG. 1;

FIG. 2A is a partial side section similar to FIG. 2 but illustrating a variation in the interior shape of the quill;

FIG. 3 is an opposite end view of the quill; and

FIG. 4 is a schematic partial view of a turbine and associated bearing end cap to which the quill is secured.

DETAILED DESCRIPTION OF THE INVENTION

With reference to FIGS. 1–3, the quill (or mounting block) 10 includes a generally vertically (or radially) oriented body portion 12 and an axially extending mounting flange portion 14. Extending substantially transversely through the body portion 12 is a probe bore 16, having a relatively larger diameter portion 18 and a relatively smaller diameter portion 20 interconnected by a tapered shoulder 22. In the exemplary embodiment, portion 18 has a diameter of about 0.75 in. and portion 20 has a diameter of about 0.375 in. The forward or smaller diameter portion 20 is interiorly threaded at 24 and is adapted to receive an exteriorly threaded forward portion of a proximity probe P (shown only in phantom). The bore 16 extends through the body portion at an acute angle relative thereto, and at an angle of preferably about 10°, relative to horizontal (as viewed in FIG. 1), and relative to the rotor axis (FIG. 4).

The mounting flange portion 14 of the quill includes a first bore 26 adapted to receive a dowel pin which extends into a corresponding locator hole 28 on the interior surface 30 of the bearing cap, partially shown at 32. A second mounting hole 34, laterally offset relative to locator hole 26, is used to secure the quill to the inside surface of the bearing cap by means of a suitable fastener such as a bolt or screw, to be threaded into hole 36. A third bore 38 is also utilized to secure the quill to the bearing cap by means of a screw or bolt to be threaded into hole 40. In order to have access to the bore 38, a larger diameter counterbore 42 is provided within the quill extending from below the probe bore all the way to the mounting flange portion 14. Prior to installation of the probe, it will be appreciated that with a suitable tool, access may be gained for purposes of installing or removing a bolt within the hole 38 during assembly or disassembly of the quill from the bearing end cap 32.

In FIG. 2A, the inner taper 22 is extended from the relatively smaller diameter portion 20 to the bore 42, effectively eliminating the constant diameter bore portion 18. This tapered region (with a taper of about 20° relative to the bore axis), indicated by numeral 19, facilitates the insertion of the probe P.

FIG. 4 illustrates the quill 10 secured to the interior surface 30 of the bearing end cap 32, with probe P in place, with a leading end thereof in close proximity to the rotor, partially shown at 44, with the rotor axis indicated at 46.

The proximity probe itself forms no part of this invention, and may be any commercially available proximity probe. Suitable probes are commercially available from Bentley-Nevada Inc. The probe end is threaded into the forward section 20 of the bore 16 and located precisely relative to an adjacent rotor surface to thereby enable measurement of any axial movement of the rotor. Very fine threads are preferred to facilitate precise adjustment of the probe position. This new quill design is cheaper to manufacture, eases the installation of the probe and maintains the accuracy of the measurement of the rotor's axial movement.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mounting block for locating a measuring device in proximity to a rotor surface, said mounting block comprising a substantially vertically oriented body portion having a bore adjacent one end thereof, said bore adapted to receive a forward end of the measuring device; and a mounting flange portion at a second opposite end of said mounting block, oriented substantially perpendicularly to said body portion, for securing the mounting block to a machine component, wherein said bore is oriented at an acute angle relative to said body portion and to said mounting flange portion.

2. The mounting block of claim 1 wherein said acute angle is about 10°.

3. The mounting block of claim 1 wherein said bore has a relatively larger diameter section and a relatively smaller diameter section, said relatively smaller diameter section being threaded.

4. The mounting block of claim 3 wherein said relatively larger diameter section has a diameter of about 0.75 inch.

5. The mounting block of claim 4 wherein said relatively smaller diameter section has a diameter of about 0.375 inch.

6. The mounting blcok of claim 3 wherein said relatively smaller diameter section has a diameter of about 0.375 inch.

7. The mounting block of claim 1 wherein said bore has a relatively small diameter portion, and an adjacent tapered section, said relatively smaller diameter section being threaded.

8. The mounting block of claim 1 wherein said mounting flange portion includes a dowel pin hole adapted to locate the quill on the machine component by means of a dowel pin.

9. A mounting block for locating a measuring device in proximity to a rotor surface, said mounting block comprising a body portion having a bore adjacent one end thereof, said bore adapted to receive a forward end of the measuring device; and a mounting flange portion at a second opposite end and oriented substantially perpendicularly to said body portion, for securing the mounting block to a machine component, said mounting block including at least two fastener holes, one of which is accessed by means of an access hole extending through said body portion, intersecting said bore.

* * * * *